April 16, 1963 E. C. BERGER 3,085,470
APPARATUS FOR IMPROVING VISUALITY OF PROJECTED IMAGES
Filed Oct. 20, 1959 2 Sheets-Sheet 1

INVENTOR.
E. CURT BERGER
BY
Darby + Darby
ATTORNEYS

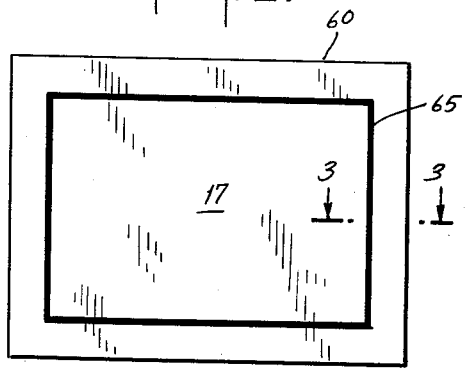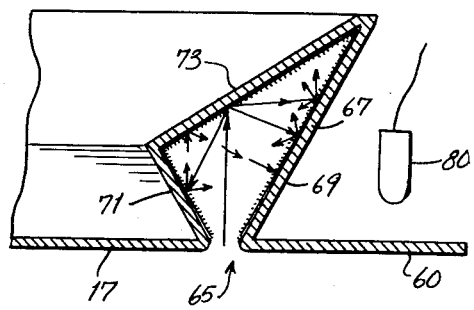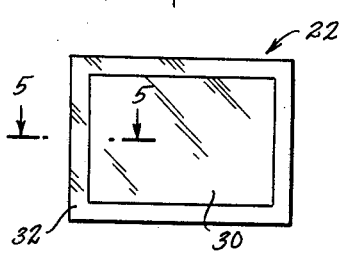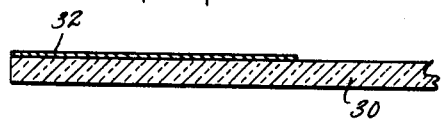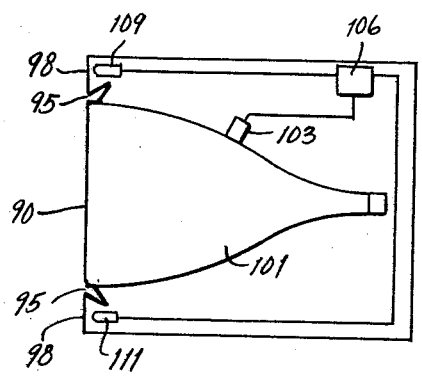

United States Patent Office 3,085,470
Patented Apr. 16, 1963

3,085,470
APPARATUS FOR IMPROVING VISUALITY OF PROJECTED IMAGES
Emilio Curt Berger, Galicia 1966, Montevideo, Uruguay
Filed Oct. 20, 1959, Ser. No. 847,528
8 Claims. (Cl. 88—24)

This invention relates to improving the visuality of an image projected on a surface and more particularly relates to the illumination of areas adjacent to an image projection surface for improving the visual acuity of viewers seeing an image projected thereon.

While the background history and preferred embodiment of the present invention will be discussed primarily in terms of motion picture projection work, it is not meant to be limited solely to that field. The present invention is applicable to any image projection system, such as used with lantern, stereoptican slides, television systems, motion picture projection, etc.

Motion pictures today are normally projected on a screen by suitable projection apparatus which normally includes a light source and a film projector apparatus which sequentially moves film transversely through a projected light beam from the light source so that a single film frame is periodically illuminated. The projected light beam then passes through a suitable lens system for projecting the image onto a screen. The trend today in motion picture work is to use a wider size screen picture and means for suggesting depth such as curving the screens for simulating a third dimension to the screen picture.

Conventionally in indoor theatres, light absorbing curtains or drapes are placed abutting the peripheral edges of the screen surface for reducing reflected stray light so that the illuminated screen image is totally enclosed by a dark surfaced, non-illuminated border. Also, in outdoor movies, only the projected image illuminates the screen with the surrounding supporting structure not being illuminated.

In television receivers the cathode ray tube receives its projected image from the surface opposite the viewing surface. Some receivers have a dark metallic border about the picture tube while others have used a luminous tube around the perimeter of the television picture tube which provides a constant intensity haze thereabout.

As is well known in the motion picture art, the light projected onto a screen is ordinarily of greater brilliancy at the center than near the edges of the screen. Thus, the projected image areas adjacent the edges are darker and consequently, the screen image has a reduced definition in the areas abutting the screen edges. The light distribution over the surface of the screen is the ratio of the illumination near the edge of the screen to the illumination at the center, usually measured along a horizontal center line. This ratio is normally termed "the side to center distribution ratio" and varies from about fifty percent to about seventy-five percent depending on type of light and lens system used.

Heretofore, the dark surrounding border adjacent to the outer periphery of the illuminated screen area, combined with the reduced light intensity of the illuminated area of the screen adjacent its peripheral edges, resulted in poor contrasts and poor contours of the projected image on the screen area abutting its peripheral edges. In effect, since the darker portions of the screen image adjacent the screen edges have no sharp outline against the dark background of the surrounding border area, these darker portions of the image merge or blend into the dark surrounding border. As a result, the definition or sharpness of the screen picture or image adjacent the peripheral edges of the screen is not clear, thus making the viewing of the picture by an audience difficult.

Since the image on the screen constantly changes, the position of the darker image portions change continuously with the lighter image portions. Since this change in position between dark portions and light portions of the border areas of the picture on the screen is normally slower than the movement of the individual film frames of the picture, the frequency of these changes is often below the flicker fusion frequency of the viewers' eyes so that these recurring flashes of poor contrast and poor contour portions in the projected image on the screen are perceptible as flicker. Flicker fusion frequency is related to the persistence of vision which phenomenon makes motion pictures and television possible. The eye transmits to the brain a certain number of separate impressions per second, as separate impressions, but beyond that number the impressions become merged into each other so that the effect is that of continuity. If the flashes of light and darkness are spaced too far apart or disproportionate to one another, then the eye will perceive the difference and instead of continuous steady illumination will result in flicker. This "flicker" causes annoyance, eye strain, fatigue, and hence reduces the effectiveness of the projected picture. Even upon the illumination of the screen adjacent the screen edges being increased, the poor contrast between dark screen image portions adjacent the screen edges and the dark border remains, causing the same problem. As a result of this flicker and lack of sharpness of the border portion of the screen picture, the eyes of the viewers concentrate on the clearer center portion of the screen picture, thus reducing the effectiveness of the usable screen area substantially.

The same problem arises with television receiving sets including those having a luminous tube around the perimeter of the picture tube. However, in the latter case the problem results from those portions of the projected image which are lighter and more nearly equal in light intensity at the luminous tube.

Ordinarily, motion picture theatres are darkened or at most, dimly lit, with only severely limited indirect lighting being provided. Until the eyes of the viewers adapt to the dimly lighted interior of the theatre, they do not have the ability to see clearly the projected image. Upon entering the interior of the theatre the pupil of the eye automatically dilates or expands. Further, the retina of the eye also adapts itself to the dimly lighted interior of the theatre. Once the pupil and retina of the eye adapt to the dimly lighted interior, the eye is then in its most sensitive condition. The varying brilliancy of the projected picture on the screen causes the pupil to expand or contract for regulating the amount of light reaching the retina of the eye as well as causing the retina to adjust to the change, and if this change occurs continuously and rapidly, the strain on the eye, hence on the viewer, is highly discomforting and often injurious.

Thus, in the past, an audience viewing a motion picture was not able to discern clearly all the detail of the projected image, and in particular, the portion of the screen image abutting the peripheral edges of the screen. Further, the eyes of the audience, upon adapting to the dimly lighted interior, constantly had their pupils and retinas constantly adjusting and changing in relation to the brightness of the projected image.

It is therefore an object of the present invention to provide apparatus that will improve the visual acuity of an audience viewing a projected screen image.

Another object of the present invention is to provide apparatus for selectively illuminating areas adjacent a screen for emphasizing the contrast and contours of the projected image, thus providing clarity of detail of the entire projected image and producing an added illusion of depth.

A further object of the present invention is to provide apparatus for stabilizing the sensitivity of the eyes of the audience in theatres so that they may more readily adjust to the specific intensity of the screen picture.

A still further object of this invention is to provide a screen and an illuminated surrounding area which attracts and fixes the viewer's attention on a projected screen image.

Another object of this invention is to provide apparatus for artistically complementing the projected screen image.

A further object is to provide a non-surface black border abutting the screen edges.

Still another object is to provide apparatus that accomplishes all of the above and yet is simple in design and construction, reliable in use and easy to operate.

Other objects of the invention will be apparent when the following description is considered in connection with the annexed drawings in which:

FIGURE 1 s a diagrammatic perspective view of one embodiment of the present invention;

FIGURE 2 is a front elevational view of a motion picture screen in accordance with the present invention;

FIGURE 3 is an enlarged, broken sectional view taken along line 3—3 of FIGURE 2;

FIGURE 4 is a front elevational view of one form of an intercepting mirror assembly;

FIGURE 5 is an enlarged broken away sectional view taken along line 5—5 of FIGURE 4; and FIGURE 6 is a schematic plan view of a television receiver incorporating one embodiment of the present invention.

Figure 1:
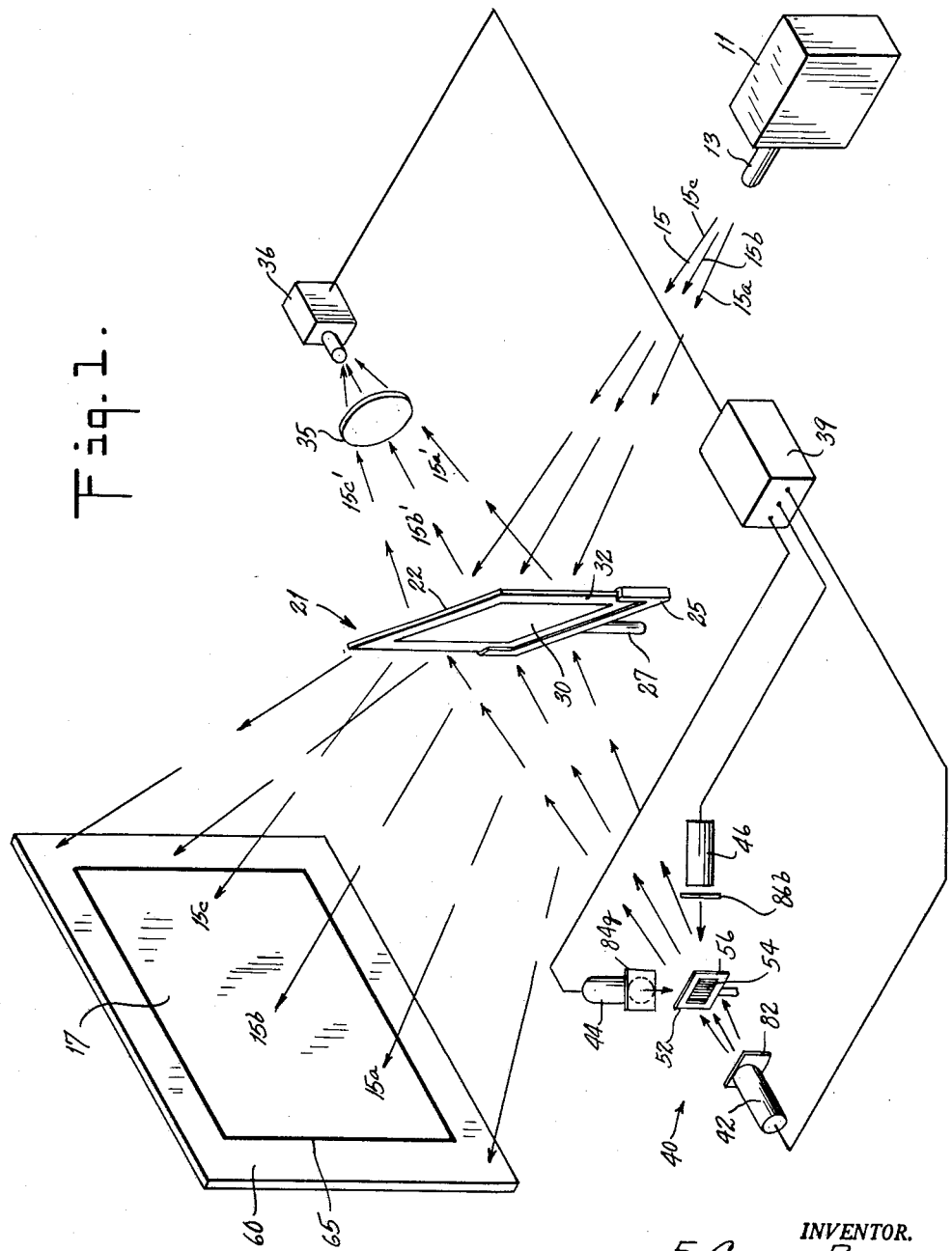

The present invention provides apparatus which improves the general visuality of a projected screen picture, by emphasizing the contour of portions of the screen picture as well as heightening the contrasts of varying shades of hue or gray of the picture.

It has been accepted by those skilled in the art of studying and understanding the functions of the human visual organ that the basic factors determinative of visual functions are: (1) light sense or discrimination of brightness, (2) retinal resolution or the physiological resolving power, (3) color sense or chromatic discrimination, (4) form sense or letter and simple form discrimination, (5) optical time sense or flash discrimination.

Heretofore, a dark or light absorbing border has been placed about the outer peripheral edges of the motion picture screens, primarily for providing less distraction for the eyes of the viewer, as well as simulating the effect of added light brilliancy on the screen without the light intensity of the source being increased, since it was thought that by the use of a dark surrounding area, the projected picture on the screen appeared more brilliant due to the contrast provided. Applicant has found that all of the basic factors mentioned above are markedly improved by having a relatively thin black area or border surrounding the projected image with a larger illuminated area surrounding this black border area. With this illuminated area or border having a brightness or luminance substantially equal to the brightness of the screen, the visual acuity of the viewers is greatly improved. While the absolute effect of an illuminated border on discrimination of brightness of the eye may be reduced somewhat, the overall effect is beneficial, since it avoids the continual change in adaptation of the eye due to changes in intensity of the screen picture and hence exerts a stabilizing effect on the eye. However, if only an illuminated surrounding area or border is placed about the projected image, improved visual acuity of the audience is obtained as compared to only a dark border being used. This improvement occurs only under certain specified conditions which are dependent upon the image size, the illumination of the image, and the illumination and size of the surounding illuminated area.

A conventional motion picture projector and lens is schematically indicated at 11 in FIGURE 1. The projected image passes through a suitable lens system 13 for projecting a light beam 15 onto a conventional screen 17. Light beam 15 is schematically indicated as three separate beams, 15a, 15b and 15c respectively.

Disposed in the path of projected light beam 15 is an intercepting mirror assembly 21. Mirror assembly 21 has a mirror portion 22 which is supported in a mirror holder 25. Mirror holder 25 is preferably rotatably supported in some convenient manner such as a post 27, which is located in a suitable thrust bearing, not shown, to provide for precise rotation. As indicated in FIGURES 4 and 5, mirror portion 22 has a plate glass body 30 with a border 32 about the peripheral edges of body 30. Border 32 is highly reflective and preferably is mirrored or highly polished chromium. Plate glass body 30 is a high grade type of port glass which has a light transmission of about ninety-two percent. Thus, only a small percentage of the light beam is reflected from plate glass portion 30 so that almost all the projected light reaches screen 17. Mirror assembly 21 is positioned with respect to light beam 15, so that light beam 15 passes unobstructedly through the plate glass center portion 30 for projection onto screen 17. Mirror portion 22 is preferably fixed at a 45° angle with respect to the plane of screen 17. Positioned at a 45° angle with respect to plate glass or body portion 30 of mirror 22 is the input of a light actuated cell or photoelectric cell 36. Photoelectric cell assembly 36 is positioned with respect to plate glass portion 30 so that the small reflected portion of light from light beam 15 passing through body portion 30, illustratively indicated at 15a', 15b' and 15c', is collected by a lens assembly 35 and directed to the photocell, not shown, in the photocell assembly 36. As is commonly known, a photocell is actuated proportionally to light such as the reflected light from plate glass portion 30. The output from photocell assembly 36 may be amplified or fed directly via connector 37 into a control unit 39 which functions will be discussed below.

Disposed to one side of mirror assembly 21 is a secondary light source assembly indicated generally at 40. As shown in FIGURE 1, secondary light source 40 advantageously has three lamps 42, 44 and 46. While three lamps have illustratively been shown, more or less may be used according to the effect desired, as will be discussed below. Where a plurality of lamps are used, the light from each should uniformly illuminate the mirrored border 32 of mirror portion 22. One embodiment for accomplishing uniform light distribution is a lens and mirror assembly.

Lamp 42 projects its light directly onto mirror assembly 21, whereas lamps 44 and 46 have their light reflected onto mirror assembly 21. Disposed in the path of the projected light beam from lamp 42 is a lens and mirror assembly 52. Lens and mirror assembly 52 has an opaque rectangular center portion 54 with the border thereabout 56 made of one way transmitting glass. As shown, the transmitting direction is towards mirror 22. Assembly 52 is adapted to be rotated so as to have its plane lie substantially 45° with respect to the plane in which mirror unit 22 lies. Advantageously, lamps 42, 44 and 46 are movable with respect to assembly 52 in any convenient manner. The light projected from lamp 42, passing through its lens system is transmitted only through border 56 of assembly 52, and opaque section 54 of assembly 52 absorbs substantially all of the light impinging thereon and reflecting only a small portion thereof. The light from lamp 42 transmitted through border 56 strikes only mirror border 32 of mirror assembly 21. Light projected from lamps 44 and 46 which impinges on opaque center 54 of assembly 52 is similarly absorbed, and the light striking the border portion 56 of frame assembly 52 is reflected onto border 32 of mirror assembly 21. The light striking border 32 of mirror assembly 21 from lamps 42, 44 and 46 is in turn reflected onto an area adjacent the peripheral edges of screen 17, such as screen surfaced border 60.

Disposed between screen 17 and border 60 is a dark, preferably black, border 65.

It is well known in the art that "black" as a surface does not exist, since it always remains a shade of gray as long as illumination is reflected therefrom. Black may be defined as "absence of light stimulus." Ideally, this can never be obtained as long as a surface is used which reflects light. Therefore, to approach the ideal black surface no surface is used, or a "non-surface black." In the case of surface black, contrast between a black surface and white parts of a surface changes in a complex way. As the quantity of the luminous flux striking the surfaces increases, more and more light flux or light is reflected from both parts of the surface with less total light being reflected from the black surface. The proportion is not constant throughout the increases of illuminance, especially at portions of the surfaces that have contours. However, where a non-surface black is used there is no reflection from it throughout the increase of luminous flux incident thereto and thus there remains total absence of light. The white background, however, increases the amount of reflected light flux with an increase of incident flux so that the contrast between the non-surface black and the white surface is directly proportional to the illumination or luminance. Black border 65 is illustratively shown in FIGURE 3 as a non-surface black, in which the border 65 is an opening of an enclosure 67. Enclosure 67 has walls or arms 69 and 71 extending angularly from the edges of opening 65. Advantageously, a slanted rear wall 73 connects the ends of arms of 69 and 71 respectively. The inner surfaces of walls 69, 71 and 73 are coated with an efficient light absorbing material, such as black wool or lamp black, so that any light striking opening 65 is for all effect, absorbed. As an incident light beam enters opening 65, it strikes wall 73 and a large portion of the light beam is absorbed. The portion of the incident light beam not absorbed is reflected to side walls 69 and 71 and is absorbed by these walls or re-reflected. After repeated reflections, practically all of the incident incoming energy is absorbed with only a very minute portion ever escaping back through opening 65. Therefore, border 65 approaches an ideal black surface. With a non-surface black border even the dark portions of the projected screen image abutting this border is "lighter" and hence there is no merging of the image into the surrounding border, and so a continuous contrast is always provided. However, it is the white or illuminated surrounding frame area that creats the final contrast contour.

The standard width film, 35 mm., has a film frame dimension of .825 inch wide and .600 inch high. With a projected image from a 35 mm. film on the screen, the total area of frame 60 is preferably equal to the total image area projected on screen 17. With this screen arrangement, a large improvement in visuality of the projected image is obtained upon the black border 65 being one tenth of the illuminated border 60, or if a uniform border about the screen image is used, then black border 65 is 1/10 of illuminated border 60 on each edge.

With a 35 mm. film being projected, advantageously, the total luminous flux incident to screen 17 is substantially equal to the total intensity or luminous flux incident to frame 60 at any given instant. Since in the present embodiment, the incident, or projected screen light is measured by photocell assembly 36, it is desirable that the projected light from secondary light source 40 which will be incident on border 60, be able to be controlled. Since the ratio of total light reflected in all directions by the screen to that incident on the screen is normally less than 100 percent, advantageously, border 60 is made from the same type of material as screen 17 so that ratio of incident to reflected light for both the screen and the border is the same. The audience, in viewing the projected image, is concerned with the reflected light from the screen. The brightness sensation of a surface depends on the luminance of that surface which is defined as intensity per unit of projected area of source. Therefore, since screen 17 and border 60 are made of substantially equal reflecting material, the number of lumens emitted per unit of area with respect to the number of lumens incident per unit of area is substantially equal. "Emitted" includes the flux diffusely transmitted or reflected from a surface and the total luminous flux emitted in all directions per unit area of the emitting surface is called the luminous emittance of the surface. To maintain the desired relationship between the luminance of the frame 60 and the luminance of screen 17, the light intensity reflected from mirror border 32 which is incident to frame 60 is controlled by varying the light intensity of the secondary light source 40, or as shown in FIGURE 1, lamps 42, 44 and 46. The light reflected from plate glass portion 30 of mirror portion 22 to photocell assembly 36 actuates the photocell therein to produce an electric current in proportion to the intensity of the light received by the photocell therein as is well known in the art. This electric current may be amplified or sent directly to a control box 39 via conductor 37. In a manner well known to the art, a predetermined current flow from photocell 36 controls the amount of current passing through lamps 42, 44 and 46, so as to control the radian flux emitted by these lamps. Preferably, lamps 42, 44 and 46 are of the glow-modulator type of tube, so that upon a constant current passing through the tube, they give off a light intensity which is proportional to direct current passing therethrough. Further, a glow-modulator type tube is advantageously used in that it produces light flashes or pulses in response to a series of short pulses of direct current being sent therethrough. This type of tube provides a perfect square wave form of light stimulus with a transition time less than one percent of the cycle length. The frequency of light flashes per second may be changed by various means such as a motor, the velocity of which may be easily regulated and controlled, or other type of electronic multi-flash generator. The input electric current fed to lamps 42, 44 and 46 is preferably intermittent distinct pulses, of a frequency higher than the flicker fusion frequency of the audience. The pulses of light should preferably be above fifty flashes per second.

While three lamps have been shown in the secondary light source 40, ordinarily for black and white film one lamp would be sufficient. If a colored image is projected on the screen it is often desirable to produce colored light over frame 60 for artistically complementing the projected image. Normally, three lamps representing the primary additive colors are sufficient to illuminate frame 60 with a light having varying hues or many colors by varying the intensity of the selected ones of the primary colors. To produce a colored border, lens holders 82, 84 and 86 are placed transversely in front of lamps 42, 44 and 46 respectively. A colored lens of one of the primary additive colors, red, green or blue is placed in a respective lens holder, such as blue being placed in lens holder 82, green being placed in lens holder 84 and red being placed in lens holder 86. By varying the quantity of luminous flux emitted by a predetermined lamp, various colors can be projected on border 60.

With the larger films often being used, with its resultant larger screen image, the size of the illuminated border need be only as large as to completely cover the retina of the eye, which will be often less than the area of the screen used with respect to the conventional 35 mm. frame discussed above. Hence, with the larger size films the ratio of area of illuminated border and screen picture is not necessarily in the same ratio as discussed above with respect to the 35 mm. film. It has been found that approximately the same area of illuminated border area used with a 35 mm. film is also satisfactory with the larger screen pictures.

Another embodiment of means for illuminating border 60 is shown in FIGURE 3, where a lamp 80 is shown disposed to the rear of border 60, which is made from a translucent material which diffuses the light flux emanating from lamp 80 so that border 60 is uniformly illuminated. Preferably a series of lamps are disposed to the rear and about translucent border 60. The quantity of luminous flux emitted by lamps 80 are controlled in a manner similar as described above with respect to secondary light source 40, so that the luminance of border 60 can be varied with respect to the luminance of screen 17.

An embodiment of apparatus for varying the luminance of a border about a television screen in a receiving set is shown in FIGURE 6. Abutting the outer peripheral edge of viewing screen 90 is a non-surface black border 95, similar as border 65 in FIGURES 2 and 3. Abutting border 95 is a translucent border 98. Attached to cathode ray tube 101 in some convenient manner is a photocell unit 103 output signal is transmitted to a control unit 106 which controls the quantity of light flux emitted by lamps abutting border 98, indicated at 109 and 111 so as to make the luminance of border 98 substantially equal to screen 90.

While photocell assembly 36 has been shown on the side opposite of mirror assembly 21, it will be apparent that this is merely for convenience and it may be placed at other positions. Further, a series of photocells would be used to insure a more representative measure of the incident or reflected light. Also, to insure all of the projected light from movie projector 11 from reaching the film, mirror portion 22 could have center plate glass portion 30 removed, so that the projected light will pass therethrough directly to screen 17. Photocell assembly 36 may then be placed to the side of screen 17 or to the rear of screen 17 if it is translucent to receive the reflected light from screen 17. This would require a recalibration of photocell unit 36 to vary the amount of current fed into control box 39 which controls the quantity of luminous flux emitted by lamps 42, 44 and 46.

While black strip 65 was shown as a "non-surface" black frame, acceptable results could be obtained by border made of a good non-reflective material or light-absorbing material, such as wool flocking or carbon black.

If only illuminated border 60 abuts screen 17, as was mentioned heretofore, the visual acuity of the audience with respect to the projected image is improved as compared with only a dark border or even a constant intensity illuminated border being used. However, the conditions under which the improved visuality of the screen image occurs is much less flexible than when the combination of black border and illuminated border is used. With only illuminated border 60 used, the ratio of luminance of the screen to border 60 is substantially equal to 1 for a conventional screen image.

For providing artistic effects, the luminance of the frame could vary from its outer edge to its inner edge, i.e. greater at its inner edge than its outer edge, instead of being uniform throughout its area. Also, with the use of glow-modulator type of tube the frequency of the pulses may be varied to create different effects. This would be effective where different colors or hues are being projected on the illuminated border.

From the foregoing, it should be apparent that the apparatus here disclosed achieves an important practical advantage in several respects. With an illuminated border adjacent the peripheral edges of a projected image having its luminance controlled with respect to the luminance of the projected image and having a relatively thin black border interposed between the illuminated border and the screen image, the visuality of the projected image is greatly increased. The contrast and the contour of the screen image is improved making the entire image sharp and providing an added simulation of depth. Further, this arrangement results in increasing the audience enjoyment of viewing the image since it decreases the eye strain and fatigue by stabilizing the adaptation of the eyes to the projected image. Also the illuminated border becomes a part of the projected picture providing an artistic effect in a manner similar as a frame heightens the effect of a still picture. The border could be varied with respect to the mood of the picture.

It will be understood that the theoretical explanation of the manner of operation of the present invention given in the foregoing specification is believed to represent a correct statement of the principles involved and the action taking place in the present invention. However, I do not wish to be limited in any way to or by the theory described, since other theories may also explain the action of the invention.

While I have described a preferred embodiment of my invention, it will be understood that many other modifications may be made without deviating from the spirit of my invention. I wish therefore to be limited not by the foregoing description but on the contrary solely by the claims granted to me.

What is claimed is:

1. Apparatus for improving the visuality of an image projected on a screen comprising: a black border surrounding said screen and abutting the peripheral edges thereof, a reflective area surrounding said black border and abutting the outer peripheral edges thereof, means having a primary light source for forming a primary beam of light, means for locating an image in the path of said primary beam of light, means adapted to project said image onto said screen, means for locating a mirror assembly in the path of said image projection primary beam of light, said mirror assembly having a light transmitting center portion adapted to transmit substantially all of said primary beam of light and having an opaque light reflective outer border of highly reflective material, said mirror assembly lying in a plane forming an acute angle with said screen, a secondary light source of variable light output intensity for forming a secondary beam of light, an optical system intercepting said secondary light beam, positioned to direct said secondary beam of light incident to said reflective outer border of said mirror assembly, said directed secondary light beam being positioned with respect to said reflective outer border of said mirror assembly so that said secondary light beam is reflected from said reflective border onto said area surrounding said black border for illumination thereof, means measuring the intensity of said image projection primary light beam and producing output signals in proportion thereto, and means coupled to said last mentioned means for varying the light intensity of said secondary light source in response to said output signals therefrom for maintaining a substantially constant relationship between the intensities of said primary and secondary light beams, so that the luminance of said illuminated area is approximately equal to the luminance of said image projected onto said screen.

2. Apparatus as in claim 1 wherein the area surrounding said black border is substantially equal to the surface area of said screen and said black border is substantially one tenth the surface of said area surrounding said black border.

3. Apparatus for improving the visuality of an image on a projection screen comprising a light-absorbing border surrounding said screen and abutting the peripheral edges thereof, for forming a black border, an area surrounding said black border and abutting the outer peripheral edges thereof, a primary light source adapted to project said image onto said screen, a secondary light source having a variable output adapted to project a secondary light beam onto said area surrounding said black border, means for varying the output of said secondary light source in predetermined relation to the luminance of the image projected on said screen, so that the luminance of said area surrounding said black border is approximately equal to the luminance of said image on said screen, said black border comprising: an enclosure surrounding said screen and being rearwardly directed therefrom, said enclosure having an opening therein of predetermined width facing in the same general direction of said screen and abutting the peripheral edges of said screen for forming a border thereabout, said enclosure having its inner surfaces covered with non-reflective light absorbing material so that upon any light flux entering said enclosure through said opening substantially all the entering light flux is absorbed therewithin.

4. Apparatus for improving the visuality of an image projected on a screen surface comprising: an enclosure surrounding said screen and being rearwardly directed therefrom, said enclosure having an opening therein of predetermined width facing in the same general direction of said screen and abutting the peripheral edges of said screen for forming a border thereabout, said enclosure having its inner surface covered with non-reflective light absorbing material so that upon any light flux entering said enclosure through said opening substantially all the entering light flux is absorbed therewithin, an area adapted to be illuminated surrounding said screen and abutting the outer edge of said opening of said enclosure, said surrounding area and said screen surface forming separate sections of a smooth uniform surface, means adapted for illuminating said area having a varying output light intensity, and means for varying the light output of said illuminating means in response to the luminance of the image on said screen so that the luminous emittance of said surrounding illuminated area is approximately the same as the luminous emittance of the image projected on said screen.

5. Apparatus for improving the visuality of an image projected on a surface screen comprising: an enclosure surrounding said screen and being rearwardly directed therefrom, said enclosure having an opening therein of predetermined width abutting the peripheral edges of said screen for forming a border thereabout, said enclosure having walls outwardly flared abutting said opening and a rear wall connecting said flared walls, said rear wall forming an angle with the plane in which said opening of said enclosure lies, said walls having their inner surfaces covered with non-reflective light absorbing material so that upon any light flux entering said enclosure through said opening substantially all the entering light flux is absorbed therewithin, an area surrounding said dark border and abutting the outer peripheral edges thereof, said surrounding area adapted to be illuminated for emitting light flux of substantially the same as the light flux emitted by said image on said screen.

6. Apparatus for improving the visuality of an image on a screen comprising: an enclosure surrounding said screen and being rearwardly directed therefrom, said enclosure having an opening therein of predetermined width and abutting the peripheral edges of said screen for forming a border thereabout, said opening facing in the same general direction as said screen, said enclosure having its inner surfaces covered with non-reflective light absorbing material so that upon any light flux entering said enclosure through said opening substantially all the entering light flux is absorbed therewithin, an area surrounding said dark border and abutting the outer peripheral edges thereof, said surrounding area adapted to be illuminated for emitting light flux of substantially the same as the light flux emitted by said image on said screen.

7. A non-reflecting, light absorbing frame surrounding a surface to be viewed having a black border for improving the visuality of said surface comprising: an enclosure surrounding said surface and being rearwardly directed therefrom, said enclosure having an opening therein of predetermined width abutting the peripheral edges of said surface for forming a border thereabout, said enclosure having its inner surface covered with non-reflective light absorbing material so that any light flux entering said enclosure through said opening is substantially absorbed therewithin.

8. A frame surrounding a surface to be viewed having a non-reflective black border for improving the visuality of said surface comprising: an enclosure surrounding said surface and being rearwardly directed therefrom, said enclosure having an opening therein of predetermined width abutting the peripheral edges of said surface for forming a border thereabout, said enclosure having its inner surface covered with non-reflective light absorbing material so that any light flux entering said enclosure through said opening is substantially absorbed therewithin, said enclosure having walls outwardly flared abutting said opening and a rear wall connecting said flared walls, said rear wall forming an angle with the plane in which said opening of said enclosure lies, said walls having their inner surfaces covered with non-reflective light absorbing material for absorbing substantially all light flux entering through said opening.

References Cited in the file of this patent

UNITED STATES PATENTS

| | | |
|---|---|---|
| 1,130,702 | Bjerregaard | Mar. 9, 1915 |
| 1,650,964 | Bardy | Nov. 10, 1925 |
| 2,117,857 | Schlanger et al. | May 17, 1938 |
| 2,147,305 | Marten | Feb. 14, 1939 |
| 2,669,708 | Du Mont | Feb. 16, 1954 |
| 2,737,082 | Dowling | Mar. 6, 1956 |
| 2,779,938 | Pifer | Jan. 29, 1957 |
| 2,837,734 | Bowie | June 3, 1958 |
| 2,905,053 | Stableford | Sept. 22, 1959 |

FOREIGN PATENTS

| | | |
|---|---|---|
| 514,673 | Great Britain | Nov. 15, 1939 |
| 524,579 | Great Britain | Aug. 9, 1940 |